United States Patent
Chu et al.

(10) Patent No.: US 8,270,302 B2
(45) Date of Patent: Sep. 18, 2012

(54) SYSTEM AND METHOD FOR PROVIDING AN ADAPTIVE VALUE OF TTL (TIME TO LIVE) FOR BROADCAST/MULTICAST MESSAGES IN A MESH NETWORK USING A HYBRID WIRELESS MESH PROTOCOL

(75) Inventors: Liwen Chu, San Jose, CA (US); Kyeong Soo Kim, Wales (GB)

(73) Assignee: STMicroelectronics, Inc., Carrollton, TX (US)

( * ) Notice: Subject to any disclaimer, the term of this patent is extended or adjusted under 35 U.S.C. 154(b) by 704 days.

(21) Appl. No.: 11/975,546

(22) Filed: Oct. 19, 2007

(65) Prior Publication Data

US 2008/0095059 A1    Apr. 24, 2008

Related U.S. Application Data

(60) Provisional application No. 60/853,200, filed on Oct. 20, 2006.

(51) Int. Cl.
*G01R 31/08*    (2006.01)

(52) U.S. Cl. .......................... 370/238; 370/252; 370/338
(58) Field of Classification Search .................. 370/238, 370/338, 351, 252, 390
See application file for complete search history.

(56) References Cited

U.S. PATENT DOCUMENTS

| 6,104,695 | A * | 8/2000 | Wesley et al. ................. 370/216 |
| 7,522,537 | B2 * | 4/2009 | Joshi ............................. 370/254 |
| 2006/0098608 | A1 * | 5/2006 | Joshi ............................. 370/338 |
| 2006/0250999 | A1 * | 11/2006 | Zeng et al. .................... 370/312 |

* cited by examiner

*Primary Examiner* — David Oveissi

(57) ABSTRACT

A system and method is disclosed for providing an adaptive value of a TTL (Time to Live) count for broadcast/multicast messages in a wireless mesh network using a hybrid wireless mesh protocol. A mesh point controller is provided that adaptively selects the value of the TTL count and routes the broadcast/multicast message through the wireless mesh network based on the adaptively selected value of the TTL count. The adaptive selection of the TTL count in accordance with the principles of the invention significantly reduces the number of broadcast/multicast messages that must be transmitted (flooded) through the mesh network.

22 Claims, 5 Drawing Sheets

SYSTEM AND METHOD FOR PROVIDING AN ADAPTIVE VALUE OF TTL (TIME TO LIVE) FOR BROADCAST/MULTICAST MESSAGES IN A MESH NETWORK USING A HYBRID WIRELESS MESH PROTOCOL

CROSS-REFERENCE TO RELATED APPLICATION

This application claims priority under 35 USC §119(e) to U.S. provisional Application Ser. No. 60/853,200 filed on Oct. 20, 2006, and which is incorporated herein by reference.

TECHNICAL FIELD OF THE INVENTION

The present invention is generally directed to wireless mesh network technology and, in particular, to a system and method for providing an adaptive value of TTL (Time to Live) for broadcast/multicast messages in a mesh network using a hybrid wireless mesh protocol.

BACKGROUND OF THE INVENTION

A wireless mesh network is a wireless cooperative communication infrastructure that is made up of a plurality of individual wireless transceivers. Each wireless transceiver in the wireless mesh network that has network routing capabilities is a network router. A mesh network client is an electronic device that is equipped with a wireless network interface card (NIC) that enables the device to be wirelessly connected to a wireless mesh router. Such an electronic device may comprise a desktop computer, a laptop computer, a personal digital assistant (PDA), a cell phone, or other similar wirelessly enabled device.

Wireless mesh networks can be integrated with other networks (e.g., the Internet) through gateway and bridging functions in the mesh routers. Mesh network clients do not have mesh functionality such as routing capacity but use a mesh network to extend the network coverage. The mesh routers in the wireless mesh network automatically establish and maintain mesh connectivity between themselves to create an ad hoc network.

The currently proposed draft standard in the IEEE 802.11 working group that sets forth the Wireless Mesh Network is IEEE P802.11s (sometimes referred to herein as the "Standard"). The full title of the currently proposed draft standard is "Draft Standard for Information Technology—Telecommunications and Information Exchange Between Systems—Local and metropolitan area networks—Specific Requirements—Part 11: Wireless Medium Access Control (MAC) and Physical Layer (PHY) Specifications. Amendment: Mesh Networking.

In IEEE P802.11s, any node in the mesh network that supports mesh services that control, manage and operate the mesh network is a Mesh Point (MP). If a node additionally supports access to a client station (designated STA) or a non-mesh node, it is called a Mesh Access Point (MAP). A Mesh Point Portal (MPP) is a Mesh Point that has a non-802.11 connection to an external network (e.g., the Internet). A Mesh Point Portal (MPP) serves as an entry point for Medium Access Control (MAC) Service Data Units (MSDUs) to enter the mesh network or to exit the mesh network.

The Standard defines a default routing protocol called Hybrid Wireless Mesh Protocol (HWMP). The HWMP protocol is a mesh network routing protocol that combines the flexibility of on-demand routing with an option of efficient proactive topology tree extensions for routing between a root and each Mesh Point (MP). The combination of reactive and proactive elements of the HWMP protocol enables an optimal and efficient path selection in a wide variety of mesh networks.

The HWMP protocol is based on processing rules from the Ad Hoc On Demand (AODV) routing protocol (IETF RFC 3561) adapted for Layer-2 address based routing and link metric awareness. The Ad Hoc On Demand (AODV) routing protocol forms the basis for finding on-demand routes within a mesh network. Additional protocol primitives and procedures are used to proactively set up a distance-vector tree rooting at a single root Mesh Point.

The HWMP protocol supports two modes of operation depending upon the configuration. The two modes of operation are not exclusive and both of the modes may be used concurrently.

The first mode is an "on demand" mode. The "on demand" mode allows Mesh Points in the mesh network to communication using peer-to-peer routes. The "on demand" mode is used in situations when there is no root Mesh Point configured. The "on demand" mode is also used if a root Mesh Point is configured and an "on demand" path can provide a better path to a destination in the mesh network.

The second mode is a "proactive tree building" mode or "proactive" mode. As will be more fully described, the "proactive" mode can be performed by using a Root Announcement message. The "proactive" mode can also be performed by using a proactive Path Request message. In HWMP the Path Request message is used to discover a path to one or more destinations, build a proactive (reverse) path selection tree to the root Mesh Point, and confirm a path to the destination.

The HWMP protocol modes of operation utilize common processing rules and primitives. Management messages in the HWMP protocol include the Path Request (PREQ) message, the Path Reply (PREP) message, the Path Error (PERR) message, and the Root Announcement (RANN) message. The HWMP protocol management messages are sometimes referred to as Information Elements (IE) because each HWMP management message includes the corresponding IE in it. The metric costs of the mesh network links determine which route the HWMP protocol builds. In order to propagate the metric information between the Mesh Points (MP) of the mesh network, a metric field is used in the PREQ, PREP and RANN messages. A hop count field is also included in the PREQ, PREP and RANN messages to record the hop counts that a management message goes through. A Time to Live (TTL) field is also in the PREQ, PREP and RANN messages to avoid an unlimited flooding of the PREQ, PREP and RANN messages.

Routing in the HWMP protocol also uses a sequence number mechanism to maintain loop-free connectivity at all times. Each Mesh Point maintains its own sequence number. The sequence number is propagated to other Mesh Points in the mesh network in the HWMP protocol management messages.

In the proactive mode of operation, there are two mechanisms for proactively disseminating routing information for reaching the root Mesh Point (Root MP). The first method uses a proactive Path Request (PREQ) message and creates routes between the root and all Mesh Points in the mesh network proactively. The second method uses a Root Announcement (RANN) message to distribute route information for reaching the root. The second method is sometimes referred to as the "proactive RANN" method. The actual routes to the root can be built "on demand".

In the proactive PREQ method the PREQ tree building process begins with a proactive Path Request element sent by the root Mesh Point, with the destination address set to all ones (broadcast address). A Mesh Point hearing a proactive PREQ creates or updates its forwarding information to the root Mesh Point, updates the metric and hop count of the PREQ, records the metric and hop count to the root Mesh Point, and then transmits the updated PREQ. If the PREQ is sent with a "Proactive PREP" bit set to one ("1"), then the recipient Mesh Point will send a proactive PREP. The proactive PREP establishes the path from the root Mesh Point to the Mesh Point. When the path from a Mesh Point to a root Mesh Point changes, and the root Mesh Point PREQ was sent with a "Proactive PREP" bit set to one ("1"), then the recipient Mesh Point will send a proactive PREP to the root Mesh Point containing the addresses of the Mesh Points that have established a path to the root Mesh Point through the current Mesh Point.

In the proactive RANN method the root periodically floods a RANN message into the mesh network. The information that is contained in the RANN message is used to disseminate route metrics to the root. Upon receiving a RANN message, each Mesh Point that has to create or refresh a route to the root will send a unicast Path Request (PREQ) message to the root via the Mesh Point from which it received the RANN message. The unicast Path Request (PREQ) message follows the same processing rules as set forth for the "on demand" mode of operation.

The root sends a Path Reply (PREP) message in response to each Path Request (PREQ) message. The unicast Path Request (PREQ) message creates the reverse route from the root to the originating Mesh Point. The Path Reply (PREP) message that is sent in response creates the forward route from the Mesh Point to the root. When the route from a Mesh Point to a root changes, the root may send a Path Reply (PREP) message with the addresses of the Mesh Points that have established a route to the root through the current Mesh Point.

As previously mentioned, the proactive RANN method causes the root to periodically flood RANN messages into the mesh network. The RANN messages propagate route metric information across the mesh network so that each Mesh Point can select a best metric path to the announced root. This mechanism allows bidirectional trees to be built using a robust unicast procedure initiated by the Mesh Points. This mechanism ensures that the root is aware of all of the Mesh Points in the mesh network.

The proactive PREQ method also causes the root to periodically flood PREQ messages into the mesh network. The PREQ messages propagate route metric information across the mesh network so that each Mesh Point can select a best metric path to the announced root. This mechanism allows bidirectional trees to be built.

In a mesh network there are different kinds of multihop broadcast/multicast data/management messages (e.g., RANN messages, PREQ messages, or broadcast data messages). Each multihop broadcast/multicast message contains (in addition to other information) a value that represents a Time to Live (TTL) count. The Time to Live (TTL) count is an integer number that represents the maximum number of hops that a broadcast/multicast message is allowed to be forwarded in the mesh network. A Mesh Point that receives a broadcast/multicast message will decrement the value of the Time to Live (TTL) count in the TTL field before re-transmitting the broadcast/multicast message. If the decremented value of the TTL field is zero (0) then the broadcast/multicast message will be discarded.

The value of the Time to Live (TTL) count is set by the Mesh Point that originates the broadcast/multicast message. In the method used in the prior art the value of the Time to Live (TTL) count is set to a fixed value of two hundred fifty five (255) or a static network diameter. The Time to Live (TTL) count of two hundred fifty five (255) represents a maximum value of the static network diameter. A typical default value of the static network diameter and a typical default value of the TTL count of the broadcast/multicast message is thirty (30). A fixed TTL value of two hundred fifty five (255) or the static network diameter (typical value 30) means that an unnecessarily large number of broadcast/multicast messages will be transmitted and re-transmitted (flooded) through the mesh network.

Therefore, there is a need in the art for system and method that reduces the unnecessarily large number of broadcast/multicast messages that must be transmitted and re-transmitted through a mesh network due to the relatively large fixed value of the Time to Live (TTL) count in the broadcast/multicast messages.

Before undertaking the Detailed Description of the Invention below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

The term "controller" means any device, system, or part thereof that controls at least one operation. A controller may be implemented in hardware, software, firmware, or combination thereof. It should be noted that the functionality associated with any particular controller may be centralized or distributed, whether locally or remotely.

Definitions for certain words and phrases are provided throughout this patent document, those of ordinary skill in the art should understand that in many, if not most instances, such definitions apply to prior uses, as well as to future uses, of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented with any type of suitably arranged hybrid wireless mesh network.

Figure 1:
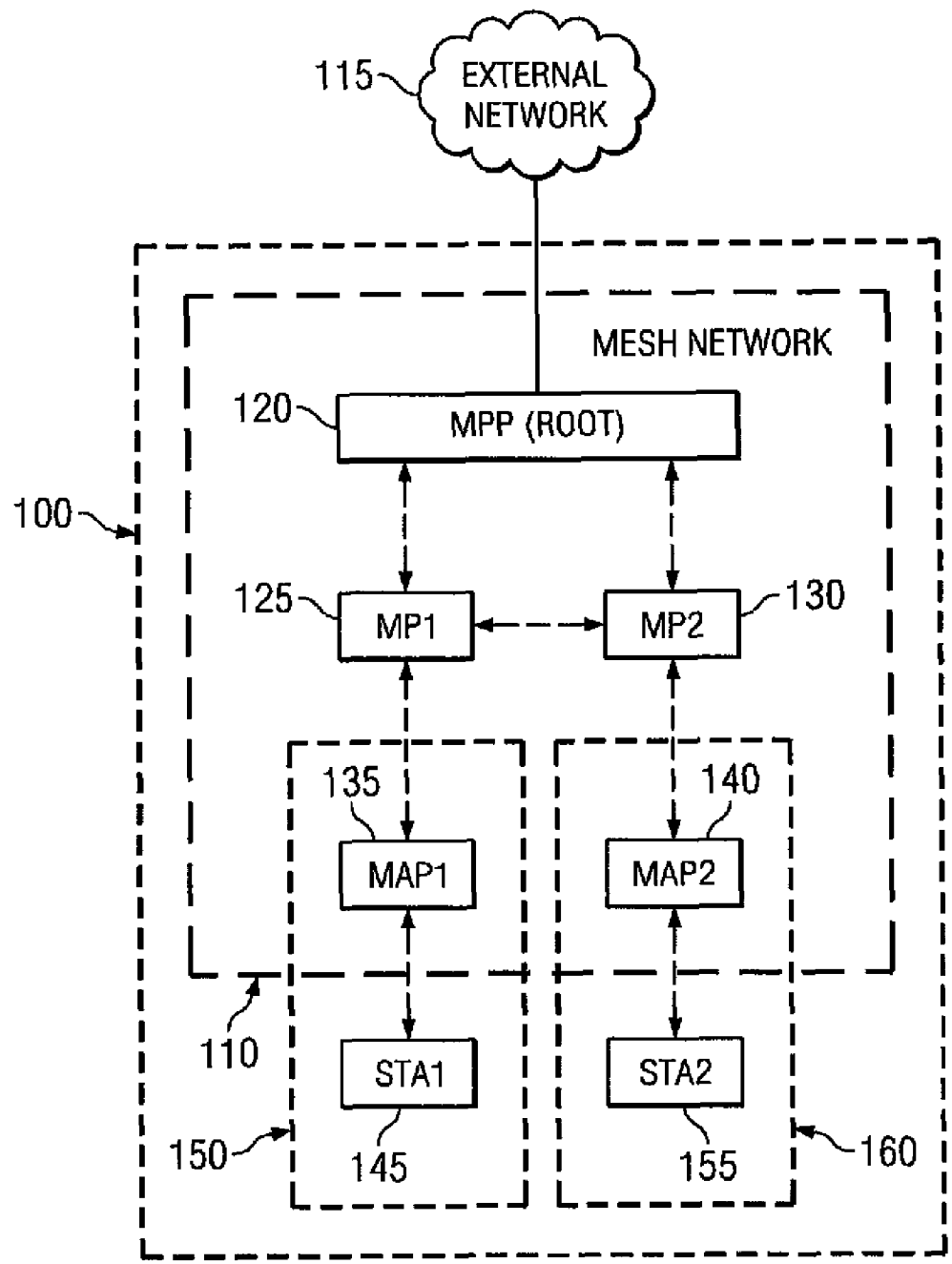
FIG. 1 illustrates a block diagram of a hybrid wireless mesh network according to the present invention.

FIG. 1 illustrates a block diagram of a hybrid wireless mesh network and basic service sets (BSS) connected by a mesh network 100 according to the present invention. The network 100 comprises a wireless mesh network 110 that is wirelessly connected (or connected by wire) to an external network 115. The wireless mesh network 110 comprises a Mesh Point Portal 120 (MPP 120). As previously mentioned, a Mesh Point Portal is a Mesh Point that has a non-802.11 connection to an external network such as the Internet.

The Mesh Point Portal 120 functions as the root Mesh Point for the wireless mesh network. The Mesh Point Portal 120 will sometimes announce itself as the Root 120. Other kinds of Mesh Points may also announce themselves as root Mesh Points. As will be more fully described, the Root 120 of the present invention is capable of adaptively selecting a value of a Time to Live (TTL) count when the Root 120 originates a broadcast/multicast message (e.g., a RANN message). The Root 120 of the present invention is also capable of helping the other Mesh Points in a mesh network to adaptively select a value of a TTL (Time to Live) count when a Mesh Point originates a broadcast/multicast message (e.g., a PREQ message).

The wireless mesh network 110 also comprises a plurality of Mesh Points. Each of the plurality of Mesh Points wirelessly communicates with the Root 120 and wirelessly communicates with each other. Two such Mesh Points are shown in FIG. 1. They are Mesh Point 125 (designated MP1) and Mesh Point 130 (designated MP2). As shown in FIG. 1, Mesh Point 125 communicates wirelessly with Mesh Access Point 135 (designated MAP1) and Mesh Point 130 communicates wireless with Mesh Access Point 140 (designated MAP2).

Mesh Access Point 135 communicates wirelessly with Client Station 145 (designated STA1). Mesh Access Point 135 and Client Station 145 comprise a first basic service set (BSS) 150. First basic service set (BSS) 150 may also comprise other client stations (not shown in FIG. 1). The other client stations communicate wirelessly with Mesh Access Point 135.

Mesh Access Point 140 communicates wirelessly with Client Station 155 (designated STA2). Mesh Access Point 140 and Client Station 155 comprise a second basic service set (BSS) 160. Second basic service set (BSS) 160 may also comprise other client stations (not shown in FIG. 1). The other client stations communicate wirelessly with Mesh Access Point 140.

The first basic service set (BSS) 150 and the second basic service set (BSS) 160 form an extended service set (ESS) that is connected by a mesh network to cover a larger scope.

Figure 2:
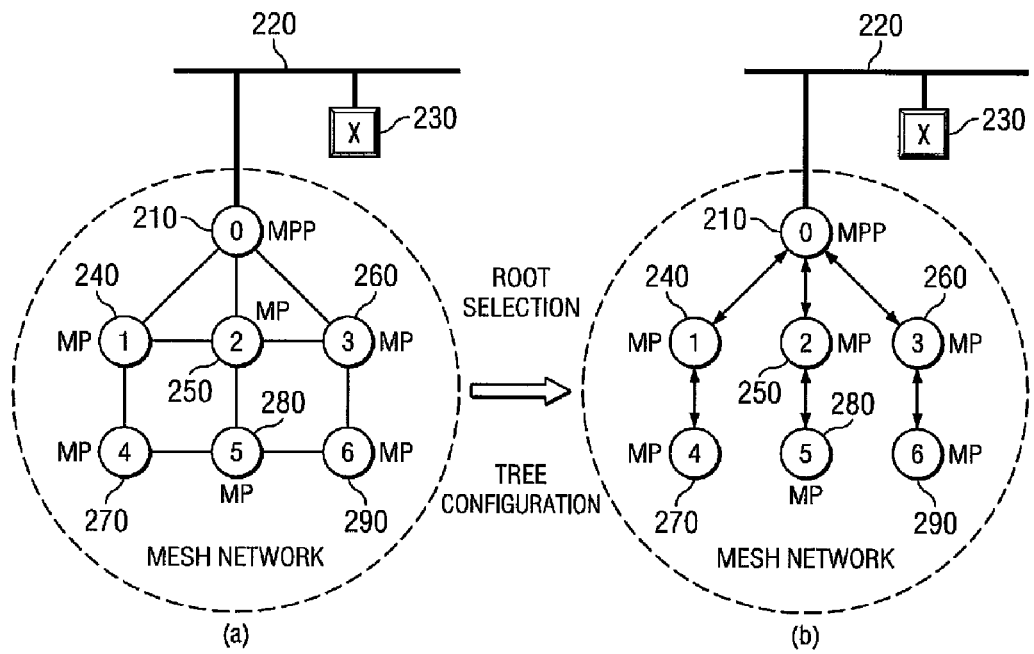
FIG. 2 illustrates an exemplary prior art mesh network.

In order to better describe the features of the present invention an exemplary mesh network will now be described. FIG. 2 illustrates an exemplary prior art mesh network 200. The mesh network 200 comprises a Mesh Point Portal (MPP) 210 (Node 0). As previously mentioned, a Mesh Point Portal (MPP) is a Mesh Point that has a non-802.11 connection to an external network. The external network that is shown in FIG. 2(a) and in FIG. 2(b) is designated with reference numeral 220. Network element 230 (designated with the letter X) is an exemplary network element that is connected to the external network 220.

The mesh network 200 comprises Mesh Point Portal (MPP) 210 and six (6) Mesh Points (MP) connected as shown in FIG. 2(a). All the link metrics are one (1). The Mesh Point MP1 (Node 1) is designated with reference numeral 240. The Mesh Point MP2 (Node 2) is designated with reference numeral 250. The Mesh Point MP3 (Node 3) is designated with reference numeral 260. The Mesh Point MP4 (Node 4) is designated with reference numeral 270. The Mesh Point MP5 (Node 5) is designated with reference numeral 280. The Mesh Point MP6 (Node 6) is designated with reference numeral 290.

Mesh Point Portal (MPP) 210 declares itself the Root Mesh Point 210 and performs the functions of the root in the mesh network 200. As shown in FIG. 2(b), the Root Mesh Point 210 proactively establishes routes from the Root Mesh Point 210 to through the network 200. A first route comprises Node 0, Node 1 and Node 4. A second route comprises Node 0, Node 2 and Node 5. A third route comprises Node 0, Node 3 and Node 6.

To provide a better understanding of the concept of RANN flooding, the broadcast/multicast message acceptance and forwarding rules will be now be described. When a Mesh Point receives a broadcast/multicast message, the Mesh Point first checks the TTL. If the TTL is equal to zero (0) after the TTL is decremented by one (1), the received message will not be forwarded. Then the Mesh Point will check the Source Sequence Number (SSN). If the SSN is smaller than the previous SSN, the received message is discarded. If the SSN is larger than the previous SSN, the received message is processed and forwarded. If the SSN is the same as the previous SSN and the path metric is smaller than the previous path metric, the received message is processed and forwarded.

Figure 3:
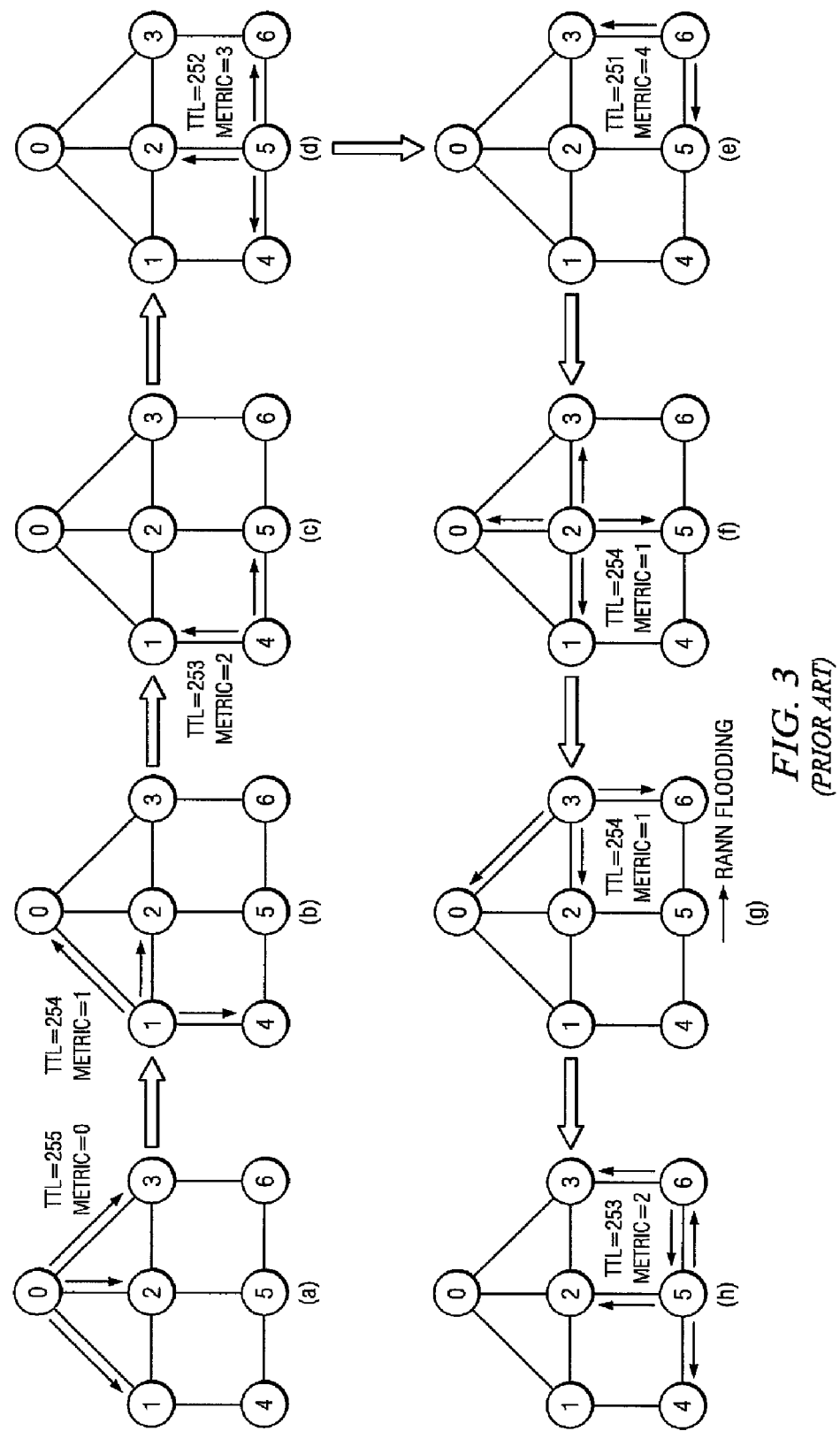
FIGS. 3(a) through 3(h) illustrate the number of broadcast/multicast message floodings (with Root Announcement message floodings as an example) that are required for the mesh network shown in FIG. 2 when a prior art value of TTL is used.

FIG. 3 illustrates the manner in which the Root Announcement (RANN) messages are sent through the mesh network that is shown in FIG. 2 when the value of the Time to Live (TLL) counter is set to two hundred fifty five (255). FIG. 3(a) illustrates a RANN message that is transmitted from the Root Node (Node 0) to its one-hop neighbors (node 1, node 2, and node 3). The value of the hop count is zero (0). In this example, relay of the RANN messages is delayed by Node 2 and by Node 3. That is, as will be described, Node 2 and Node 3 do not immediately relay the RANN messages to their neighboring nodes.

FIG. 3(b) illustrates the next step of RANN message transmission. Node 1 decrements the TTL count from 255 to 254. Because the TTL count is not zero, Node 1 then relays the RANN message to its one-hop neighbors (Node 0 (Root Node), Node 2 and Node 4).

FIG. 3(c) illustrates the next step of RANN message transmission. Node 4 decrements the TTL count from 254 to 253. Because the TTL count is not zero, Node 4 then relays the RANN message to its one-hop neighbors (Node 1 and Node 5).

FIG. 3(d) illustrates the next step of RANN message transmission. Node 5 decrements the TTL count from 253 to 252. Because the TTL count is not zero, Node 5 then relays the RANN message to its one-hop neighbors (Node 2, Node 4 and Node 6).

FIG. 3(e) illustrates the next step of RANN message transmission. Node 6 decrements the TTL count from 252 to 251.

Because the TTL count is not zero, Node 6 then relays the RANN message to its one-hop neighbors (Node 3 and Node 5).

FIG. 3(*f*) illustrates the next step of RANN message transmission. At this point Node 2 begins to relay the RANN messages. Node 2 decrements the TTL count from 255 to 254. Because the TTL count is not zero, Node 2 then relays the RANN message to its one-hop neighbors (Node 0 (Root Node), Node 1, Node 3 and Node 5).

FIG. 3(*g*) illustrates the next step of RANN message transmission. At this point Node 3 begins to relay the RANN messages. Node 3 decrements the TTL count from 255 to 254. Because the TTL count is not zero, Node 3 then relays the RANN message to its one-hop neighbors (Node 0 (Root Node), Node 2 and Node 6).

FIG. 3(*h*) illustrates the next step of RANN message transmission. Node 5 decrements the TTL count from 254 to 253. Because the TTL count is not zero, Node 5 then relays the RANN message to its one-hop neighbors (Node 2, Node 4 and Node 6). Because the TTL count is not zero, Node 6 also relays the RANN message to its one-hop neighbors (Node 3 and Node 5).

From the example shown in FIG. 3 it is clearly seen that using a TTL value of 255 contributes to the creation of nine (9) RANN message floodings. One RANN message flooding is required for the transmissions in each of the seven figures FIG. 3(*a*) through FIG. 3(*g*). Two RANN message floodings are required for the transmissions shown in FIG. 3(*h*).

As will be more fully described, the present invention significantly reduces the number of required RANN floodings for a network when the TTL value is adaptively selected based on a Hybrid Wireless Mesh Protocol (HWMP) tree depth.

Figure 4:
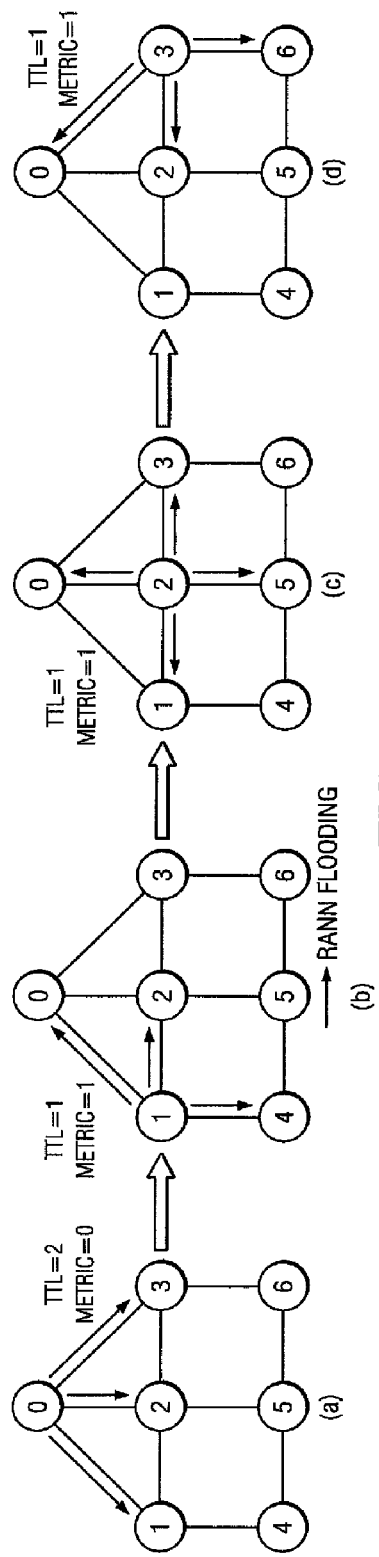
FIGS. 4(a) through 4(d) illustrate the number of broadcast/multicast message floodings (with Root Announcement message floodings as an example) that are required for the mesh network shown in FIG. 2 when a value of TTL is used in accordance with the principles of the present invention.

FIG. 4 illustrates the manner in which the Root Announcement (RANN) messages are sent through the mesh network that is shown in FIG. 2 when the value of the Time to Live (TLL) counter is set to two (2) which is the tree depth. FIG. 4(*a*) illustrates that a RANN message is transmitted from the Root Node (Node 0) to its one-hop neighbors (Node 1, Node 2, and Node 3). The TTL count that is sent from Node 0 is the tree depth which is two (2).

FIG. 4(*b*) illustrates the next step of RANN message transmission. Node 1 decrements the TTL count from two (2) to one (1). Because the TTL count is not zero, Node 1 then relays the RANN message to its one-hop neighbors (Node 0 (Root Node), Node 2 and Node 4).

FIG. 4(*c*) illustrates the next step of RANN message transmission. Node 2 decrements the TTL count from two (2) to one (1). Because the TTL count is not zero, Node 2 then relays the RANN message to its one-hop neighbors (Node 0 (Root Node), Node 1, Node 3 and Node 5).

FIG. 4(*d*) illustrates the next step of RANN message transmission. Node 3 decrements the TTL count from two (2) to one (1). Because the TTL count is not zero, Node 3 then relays the RANN message to its one-hop neighbors (Node 0 (Root Node), Node 2 and Node 6).

From the example shown in FIG. 4 it is clearly seen that using a TTL value of two (2) contributes to the creation of four (4) RANN message floodings. That is, the entire network is covered using only four (4) RANN message floodings.

The invention describes a method for a root to determine the tree depth of a mesh network based on the hop count reported by each Mesh Point between each Mesh Point and a root Mesh Point. There are two sequence numbers. They are the Source Sequence Number (SSN) and the Destination Sequence Number (DSN). The method of the invention uses the Destination Sequence Number (DSN) in the registration message (unicast PREQ or PREP). A Sequence Number (SN) is an integer sequence number that is associated with a Mesh Point that is used to distinguish newer routing information from older routing information.

When a Mesh Point receives a RANN message or a proactive PREQ message from a root Mesh Point with a new SSN (or with the same SSN but with a smaller path metric), the Mesh Point will record the hop count in the RANN message or the proactive PREQ message as the new hop count to the root Mesh Point. After a Mesh Point has received a RANN message or a proactive PREQ message from a root Mesh Point with a new SSN and enough delayed time, the Mesh Point will use a unicast proactive Path Request message or a Path Reply message to register with the root Mesh Point. The delayed time is used to guarantee that the Mesh Point finds the optimal path to the root Mesh Point.

When a root uses a RANN message to announce its existence, each Mesh Point will copy the SSN of the root and hop count of the path to the root in the RANN message to the registration message unicast PREQ as DSN and potential tree depth to register with a root. When a root uses a proactive PREQ message to announce its existence, each Mesh Point will copy the SSN of the root and hop count of the path to the root in the proactive PREQ message to the registration message unicast PREP as DSN and potential tree depth to register with a root.

A unicast PREQ or PREP Information Element that is received by a root will not be used to calculate a value of the tree depth for the mesh network if the DSN of the root in that received Information Element is less than the last received DSN. An Information Element that is received will also not be used to calculate a value of the tree depth for the mesh network if (1) the DSN of the root in that received Information Element is equal to the last received DSN, and (2) the hop count for the source Mesh Point is less than the previous value of tree depth for the mesh network.

If the unicast PREQ or PREP Information Element can be used to calculate tree depth, then the following steps are taken. First, a determination is made whether the DSN of the root in the Information Element is greater than the previous DSN. If the DSN of the root in the Information Element is greater than the previous DSN, then (1) the value of the DSN of the root in the Information Element replaces the previous value of DSN, and (2) the hop count or the potential tree depth (these two values are the same) in the Information Element is used as the value of the tree depth, and (3) a delay timer is initiated. If the delay timer times out, then the root Mesh Point selects the maximal hop count or the potential tree depth from all of the Mesh Points in the mesh network as the value of the tree depth. This delay timer is used to guarantee the root can receive the unicast PREQ or PREP message from each Mesh Point in a mesh network.

If it is determined that (1) the DSN of the root in the Information Element is equal to the previous DSN, and (2) the hop count from the source Mesh Point is greater than the previous value of the tree depth, then the hop count or the potential tree depth in the Information Element is used as the value of the tree depth.

The present invention uses the value of the tree depth of the mesh network to adaptively select a value of the TTL (Time to Live) count in a broadcast/multicast data/management message. There are two possibilities. The first possibility is that the broadcast/multicast data/management message is originated by a Root Mesh Point. The second possibility is that the broadcast/multicast data/management message is originated by a Mesh Point other than a Root Mesh Point.

The first possibility that the originator is the Root Mesh Point will now be considered. When the "proactive" mode of the HWMP protocol is in operation, the Root Mesh Point selects the TTL (Time to Live) count value to be equal to the sum of the value of the tree depth for the mesh network and a relax value. The value of the relax value is a count value that is an integer that may be equal to zero (0), one (1), two (2) or three (3). Normally the mesh network administrator selects one of the four possible values of the relax value (0, 1, 2, 3) depending on the size of the mesh network and on changes (if any) to the mesh network, and sets the selected relax value in the Root Mesh Point. Larger values of the relax value are used if the mesh network has experienced (1) an unstable wireless medium or (2) an addition or a deletion of one or more Mesh Points. If the mesh network is stable, then a relax value of zero (0) is selected.

The second possibility that the originator is a Mesh Point other than the Root Mesh Point will now be considered. When the "proactive" mode of the HWMP protocol is in operation, the Root Mesh Point broadcasts the value of the tree depth and the value of the relax value to each Mesh Point using a HWMP protocol control message (e.g., RANN message, proactive PREQ message). Each Mesh Point in the mesh network determines an "adaptive network diameter" value. The adaptive network diameter value is equal to two (2) times the value of the tree depth received by the Mesh Point. This value of the adaptive network diameter is subsequently used to determine the TTL count.

If there is more than one Root Mesh Point in the mesh network a Mesh Point will receive more than one value of tree depth (one value of tree depth from each Root Mesh Point). The Mesh Point then selects the smallest value of tree depth from all of the received values of tree depth. Then the adaptive network diameter that is determined by the Mesh Point is two (2) times the smallest value of tree depth received from the various Root Mesh Points. This value of the adaptive network diameter is subsequently used to determine the TTL count.

Each Mesh Point then selects the TTL (Time to Live) count value to be equal to the sum of (1) the adaptive network diameter for the mesh network and (2) the relax value when the sum of the adaptive network diameter and the relax value is smaller than the value of the static network diameter. As previously mentioned, the value of the relax value is an integer that may be equal to zero (0), one (1), two (2) or three (3).

The Mesh Point uses the value of the static network diameter as the TTL value when the value of the static network diameter is smaller than the sum of the adaptive network diameter and the relax value.

Figure 5:
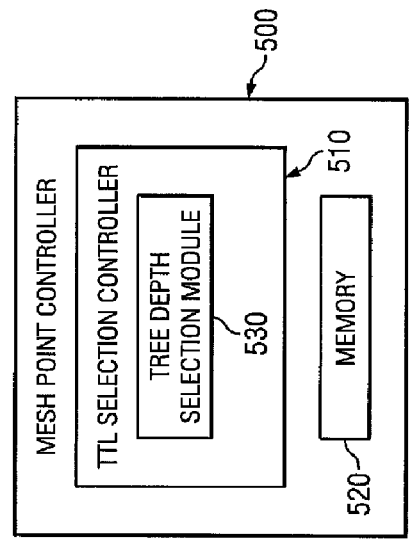
FIG. 5 illustrates an exemplary mesh point controller that comprises a TTL selection controller according to the present invention.

FIG. 5 illustrates an exemplary Mesh Point Controller 500 that comprises a TTL Selection Controller 510 according to the present invention. The Mesh Point Controller 500 comprises computer hardware and software that operates a Mesh Point in a mesh network. The Mesh Point Controller 500 also comprises a memory 520 that contains computer software for operating the Mesh Point.

The Mesh Point Controller 500 comprises a TTL Selection Controller 510 that operates in accordance with the principles of the present invention. TTL Selection Controller 510 is capable of selecting a TTL (Time to Live) value for a broadcast/multicast message using the methods of the invention that have been previously described. TTL Selection Controller 510 comprises a Tree Depth Selection Module 530. The TTL Selection Controller 510 and computer software in the Tree Depth Selection Module 530 comprise an apparatus that is capable of carrying out the present invention.

The Tree Depth Selection Module 530 comprises computer software that is capable of selecting a value of tree depth. When the Mesh Point Controller 500 is located in a Root Mesh Point then the Tree Depth Selection Module 530 selects a tree depth value for the wireless mesh network as previously described. When the Mesh Point Controller 500 is located in a Mesh Point that is not a Root Mesh Point then the Tree Depth Selection Module 530 selects a tree depth value from the various values of tree depth that the Mesh Point Controller 500 receives from the various Root Mesh Points in the wireless mesh network.

As previously described, the TTL Selection Controller 510 uses a value of the tree depth of the mesh network and a relax value to adaptively select a value of the TTL (Time to Live) count in a broadcast/multicast data/management message.

The principles of the present invention have been described above with reference to a Hybrid Wireless Mesh Protocol. The Hybrid Wireless Mesh Protocol broadcast management messages may comprise, for example, Root Announcement messages (RANN) and Path Request messages (PREQ). It is understood, however, that the principles of the present invention may also be applied to any data/management broadcast/multicast message in network that comprises a Root Mesh Point and other Mesh Points that are not Root Mesh Points.

Figure 6:
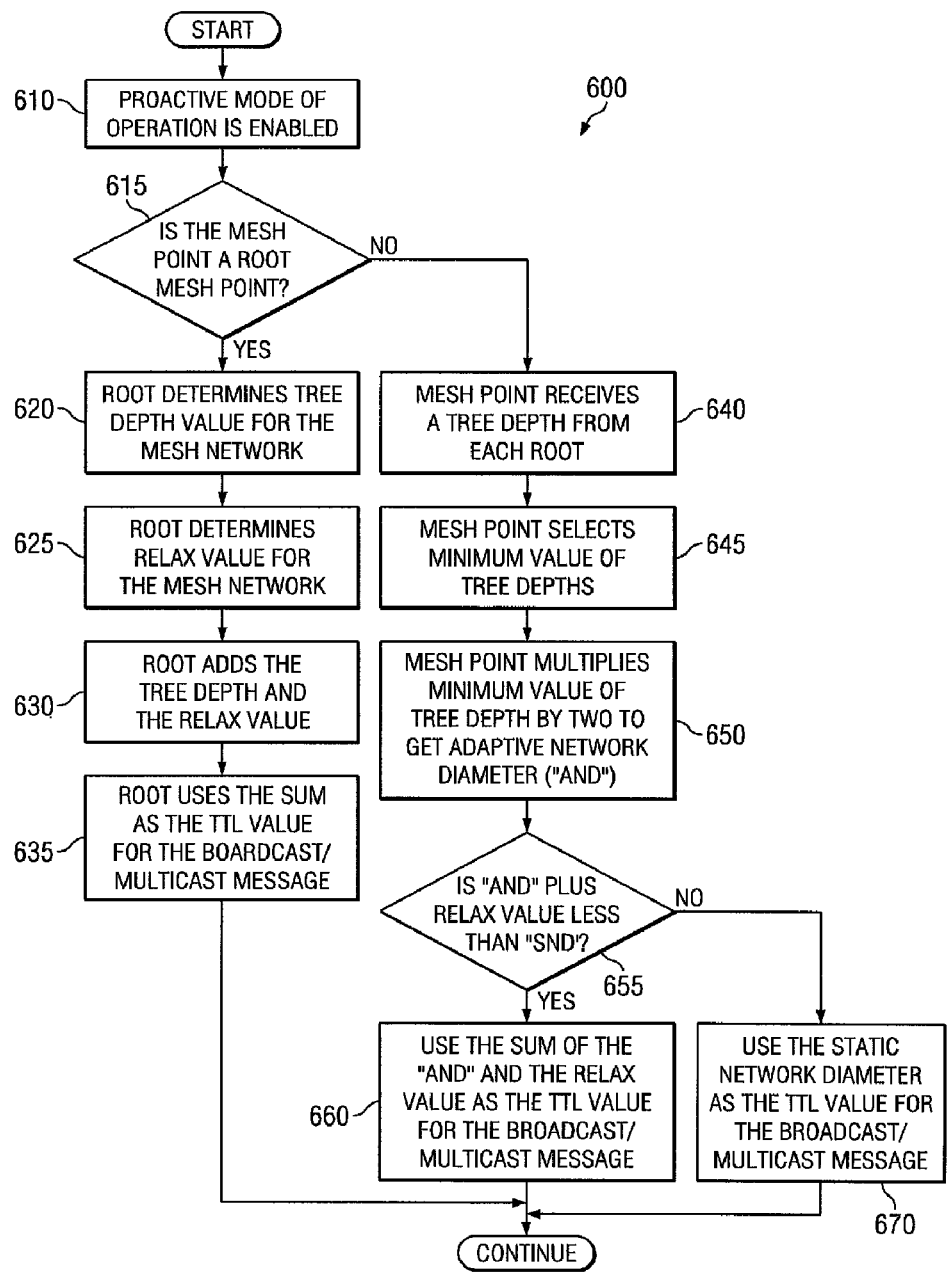
FIG. 6 illustrates a flow chart showing an advantageous embodiment of the method of the invention.

FIG. 6 illustrates a flow chart 600 showing an advantageous embodiment of the method of the invention. In the first step of the method the proactive mode of operation is enabled (step 610). Then a determination is made whether the Mesh Point is a Root Mesh Point (decision step 615). If the Mesh Point is a Root Mesh Point, then the Root Mesh Point determines the tree depth value for the mesh network (step 620). Then the Root Mesh Point determines the relax value for the mesh network (e.g., from the input of a network administrator) (step 625). The Root Mesh then adds the tree depth value and the relax value (step 630). The Root Mesh Point uses the sum of the tree depth and the relax value as the TTL (Time to Live) value for each broadcast/multicast message that it initiates (step 635).

If the decision step 615 determines that the Mesh Point is not a Root Mesh Point, then the Mesh Point receives a tree depth value from each Root Mesh Point in the mesh network (step 640). The Mesh Point then selects the minimum value of the tree depths that the Mesh Point receives from the Root Mesh Points (step 645). The Mesh Point multiplies the minimum value of tree depth by two (2) to get a value for the adaptive network diameter ("AND") (step 650).

A determination is made whether the sum of the adaptive network diameter ("AND") and the relax value is less than the static network diameter ("SND") (decision step 655). If the sum of the adaptive network diameter ("AND") and the relax value is less than the static network diameter ("SND"), then the sum of the adaptive network diameter ("AND") and the relax value is used as the TTL (Time to Live) value for each broadcast/multicast message that it initiates (step 660). If the sum of the adaptive network diameter ("AND") and the relax value is not less than the static network diameter ("SND"), then the static network diameter ("SND") is used as the as the TTL (Time to Live) value for each broadcast/multicast message that it initiates (step 670).

The foregoing description has outlined in detail the features and technical advantages of the present invention so that persons who are skilled in the art may understand the advantages of the invention. Persons who are skilled in the art should appreciate that they may readily use the conception and the specific embodiment of the invention that is disclosed as a basis for modifying or designing other structures for carrying out the same purposes of the present invention. Persons who are skilled in the art should also realize that such equivalent constructions do not depart from the spirit and scope of the invention in its broadest form.

Although the present invention has been described with an exemplary embodiment, various changes and modifications may be suggested to one skilled in the art. It is intended that the present invention encompass such changes and modifications as fall within the scope of the appended claims.

What is claimed is:

1. An apparatus for routing broadcast/multicast messages in a wireless mesh network that comprises a plurality of mesh points wherein at least one mesh point comprises:
   a mesh point controller that selects a value of a time to live (TTL) count for a broadcast/multicast message and that routes said broadcast/multicast message through said wireless mesh network based on said selected value of the time to live (TTL) count,
   wherein said mesh point controller selects said value of said time to live (TTL) count using a value of a tree depth of the wireless mesh network and a relax value of the wireless mesh network, the value of the tree depth determined based on a hop count between at least one root mesh point and at least some of the plurality of mesh points.

2. The apparatus as set forth in claim 1 wherein said broadcast/multicast message is one of a broadcast/multicast management message and a broadcast/multicast data message.

3. The apparatus as set forth in claim 1 wherein said at least one mesh point is a root mesh point.

4. The apparatus as set forth in claim 3 wherein said mesh point controller in said root mesh point selects said value of said time to live (TTL) count by (1) determining a tree depth value for the wireless mesh network and (2) adding a relax value to the tree depth value and (3) using the sum of the tree depth value and the relax value as the value of the time to live (TTL) count for the broadcast/multicast message.

5. The apparatus as set forth in claim 1 wherein said at least one mesh point is a mesh point that is not a root mesh point.

6. The apparatus as set forth in claim 5 wherein said mesh point controller in said mesh point that is not a root mesh point (1) receives a tree depth value from each root mesh point in the wireless mesh network and (2) selects a minimum value of tree depth from the values of tree depth received from the root mesh points in the wireless mesh network and (3) multiplies the minimum value of tree depth by two to obtain a value of an adaptive network diameter.

7. The apparatus as set forth in claim 6 wherein said mesh point controller in said mesh point that is not a root mesh point selects said value of said time to live (TTL) count by using the sum of the adaptive network diameter and a relax value as the time to live (TTL) count for said broadcast/multicast message when the sum of the adaptive network value and the relax value is less than a static network diameter.

8. The apparatus as set forth in claim 6 wherein said mesh point controller in said mesh point that is not a root mesh point selects said value of said time to live (TTL) count by using a static network diameter as the time to live (TTL) count for said broadcast/multicast message when the static network diameter is less than the sum of the adaptive network value and the relax value.

9. The apparatus as set forth in claim 1 wherein said mesh point controller comprises a tree depth selection module that selects said value of tree depth of the wireless mesh network based on a value of a hop count and based on a value of a destination sequence number.

10. The apparatus as set forth in claim 9 wherein said tree depth selection module in a mesh point that is not a root mesh point receives one of a root announcement message and a proactive path request message from a root mesh point and uses a source sequence number of the root mesh point and uses a value of a hop count of a path to the root mesh node as a potential value of tree depth.

11. The apparatus as set forth in claim 10 wherein said tree depth selection module selects said value of potential tree depth to be equal to the hop count in one of a root announcement message and a proactive path request message when one of
   a source sequence number of the root mesh point is larger than a previous value of the source sequence number; and
   a source sequence number of the root mesh point is equal to a previous value of the source sequence number and a value of a path metric from the root mesh point is greater than a previous value of the path metric.

12. The apparatus as set forth in claim 10 wherein said tree depth selection module sends one of a unicast path request message and a path reply message to register with the root mesh point with a potential tree depth and a destination sequence number that is copied from the source sequence number of the root mesh point in one of a root announcement message and a proactive path request message.

13. The apparatus as set forth in claim 9 wherein said tree depth selection module in a root mesh point receives one of a unicast path request message and a path reply message to register with the root mesh point from each mesh point that is not a root mesh point and uses a destination sequence number of the root mesh point and uses a value of a hop count of a path to the root mesh point as a value of tree depth.

14. The apparatus as set forth in claim 13 wherein said tree depth selection module selects a value of tree depth to be equal to a maximum value of one of the hop count from all mesh points in the mesh network and the potential tree depth from all mesh points in the mesh network when (1) a destination sequence number of the root mesh point is greater than a previous value of the destination sequence number and (2) a delay timer times out that has been set to allow the root mesh point to receive one of a path request message and a path reply message from each mesh point in the mesh network.

15. The apparatus as set forth in claim 13 wherein an information element that is received by a root mesh point will not be used to determine a value of the tree depth when a value of the destination sequence number for the root mesh point is less than the last received value of the destination sequence number.

16. The apparatus as set forth in claim 13 wherein an information element that is received by a root mesh point will not be used to determine a value of the tree depth when a value of the destination sequence number for the root mesh point is equal to the last received value of the destination sequence number and a value of hop count for a source mesh point is less than a previous value of tree depth for the mesh network.

17. The apparatus as set forth in claim 1 wherein the relax value is selected based in part on a size of the wireless mesh network.

18. A method for routing broadcast/multicast messages in a wireless mesh network that comprises a plurality of mesh points wherein the method comprises:
   selecting in a mesh point a value of a time to live (TTL) count for a broadcast/multicast message; and
   routing said broadcast/multicast message through said wireless mesh network based on said selected value of the time to live (TTL) count,
   wherein selecting a value of a time to live (TTL) count for a broadcast/multicast message comprises:

determining a value of a tree depth of the wireless mesh network based on a hop count between at least one root mesh point and at least some of the plurality of mesh points; and using said determined value of tree depth of the wireless mesh network and a relax value of the wireless mesh network to determine said time to live (TTL) count for said broadcast/multicast message.

19. The method as set forth in claim 18 further comprising selecting said value of said time to live (TTL) count in a root mesh point by:

determining a tree depth value for the wireless mesh network;

adding a relax value to the tree depth value; and using the sum of the tree depth value and the relax value as the value of the time to live (TTL) count for the broadcast/multicast message.

20. The method as set forth in claim 18 further comprising selecting said value of said time to live (TTL) count in a mesh point that is not a root mesh point by:

receiving a tree depth value from each root mesh point in the wireless mesh network;

selecting a minimum value of tree depth from the values of tree depth received from the root mesh points in the wireless mesh network; and multiplying the minimum value of tree depth by two to obtain a value of an adaptive network diameter.

21. The method as set forth in claim 20 further comprising:

selecting said value of said time to live (TTL) count by using the sum of the adaptive network diameter and a relax value as the time to live (TTL) count for said broadcast/multicast message when the sum of the adaptive network value and the relax value is less than a static network diameter.

22. The method as set forth in claim 20 further comprising:

selecting said value of said time to live (TTL) count by using a static network diameter as the time to live (TTL) count for said broadcast/multicast message when the static network diameter is less than the sum of the adaptive network value and the relax value.

* * * * *

UNITED STATES PATENT AND TRADEMARK OFFICE
CERTIFICATE OF CORRECTION

| | | |
|---|---|---|
| PATENT NO. | : 8,270,302 B2 | Page 1 of 1 |
| APPLICATION NO. | : 11/975546 | |
| DATED | : September 18, 2012 | |
| INVENTOR(S) | : Chu et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 833 days.

Signed and Sealed this
Twenty-first Day of October, 2014

Michelle K. Lee
*Deputy Director of the United States Patent and Trademark Office*